United States Patent [19]

Silverbrook

[11] Patent Number: 5,566,290
[45] Date of Patent: Oct. 15, 1996

[54] MULTI-MEDIA DEVICE

[75] Inventor: Kia Silverbrook, Woollahra, Australia

[73] Assignees: Canon Kabushiki Kaisha, Tokyo, Japan; Canon Information Systems Research Australia Pty Ltd., New South Wales, Australia

[21] Appl. No.: 53,363

[22] Filed: Apr. 28, 1993

[30] Foreign Application Priority Data

Apr. 29, 1992 [AU] Australia .................. PL2154

[51] Int. Cl.⁶ .................................. G06T 1/00
[52] U.S. Cl. ........................... 395/152; 395/154
[58] Field of Search ..................... 395/152–155, 395/162, 163

[56] References Cited

U.S. PATENT DOCUMENTS 5,065,345  11/1991  Knowles et al. .............. 395/154
5,274,758  12/1993  Beitel et al. ................. 395/154
5,355,450  10/1994  Garmon et al. ............. 395/154 X

*Primary Examiner*—Almis R. Jankus
*Attorney, Agent, or Firm*—Fitzpatrick, Cella, Harper & Scinto

[57] ABSTRACT

The present invention relates to multi-media products and, in particular, discloses a device (1) which permits both audio and video editing, storage, production and reproduction as well as a computer interface. The device (1) comprises video means (54–59) for receiving input video signals (51,52) and editing and/or augmenting same for output as video output signals (60,61); audio means (83–85) including means for receiving an audio signal (82) and outputing (86,87) same; a host processor means (63) interconnecting said audio and video means (83–85,54–59) together via interfaces (68,69) enabling connection of the device (1) for data input and output; and real-time object processor means (70) adapted for generating alterable animation for display via a video output and/or in combination with said input video signals (51,52).

14 Claims, 2 Drawing Sheets

MULTI-MEDIA DEVICE

BACKGROUND

1. Field of the Invention

The present invention relates to multi-media products and, in particular, discloses a device which permits both audio and video editing, storage, production and reproduction as well as a computer interface.

2. Description of the Related Art

In recent years, there have been numerous efforts made to provide "home" computing for consumer markets and this has been evidenced in a number of different styles of products. The first of these was based upon conventional computing technology and embodied in personal computers such as the IBM PC and the Commodore 64. A further example is the provision of video games such as those marketed by Sega, NEC, Nintendo, and Atari. Another type of pocket computer currently in use is the personal diary/scheduler such as those sold by CASIO and SHARP.

A third major type of home computer on the verge of mass production is the so-called "multi-media" computer. Such a device uses CDROM to distribute large amounts of image and other data at low cost as well as providing various degrees of video and audio reproduction as well as text. Such devices are currently sold by Philips, Sony, NEC, Tandy, Commodore and Apple.

SUMMARY OF THE INVENTION

It is an object of the present invention to provide an alternative improved multi-media device.

In accordance with the present invention there is disclosed a multi-media device comprising:

video means for receiving video signals and editing and/or augmenting same for output;

audio means including means for receiving an audio signal and outputting same;

a host processor means interconnecting said audio and video means via interfaces enabling connection of said device for data input and output; and real-time object processor means connected to said host processor means adapted for generating alterable animation for display via said video output and/or in combination with said video signals.

BRIEF DESCRIPTION OF THE DRAWINGS

A preferred embodiment of the present invention will now be described with reference to the drawings in which.

DETAILED DESCRIPTION OF THE PREFERRED EMBODIMENT

Figure 1:
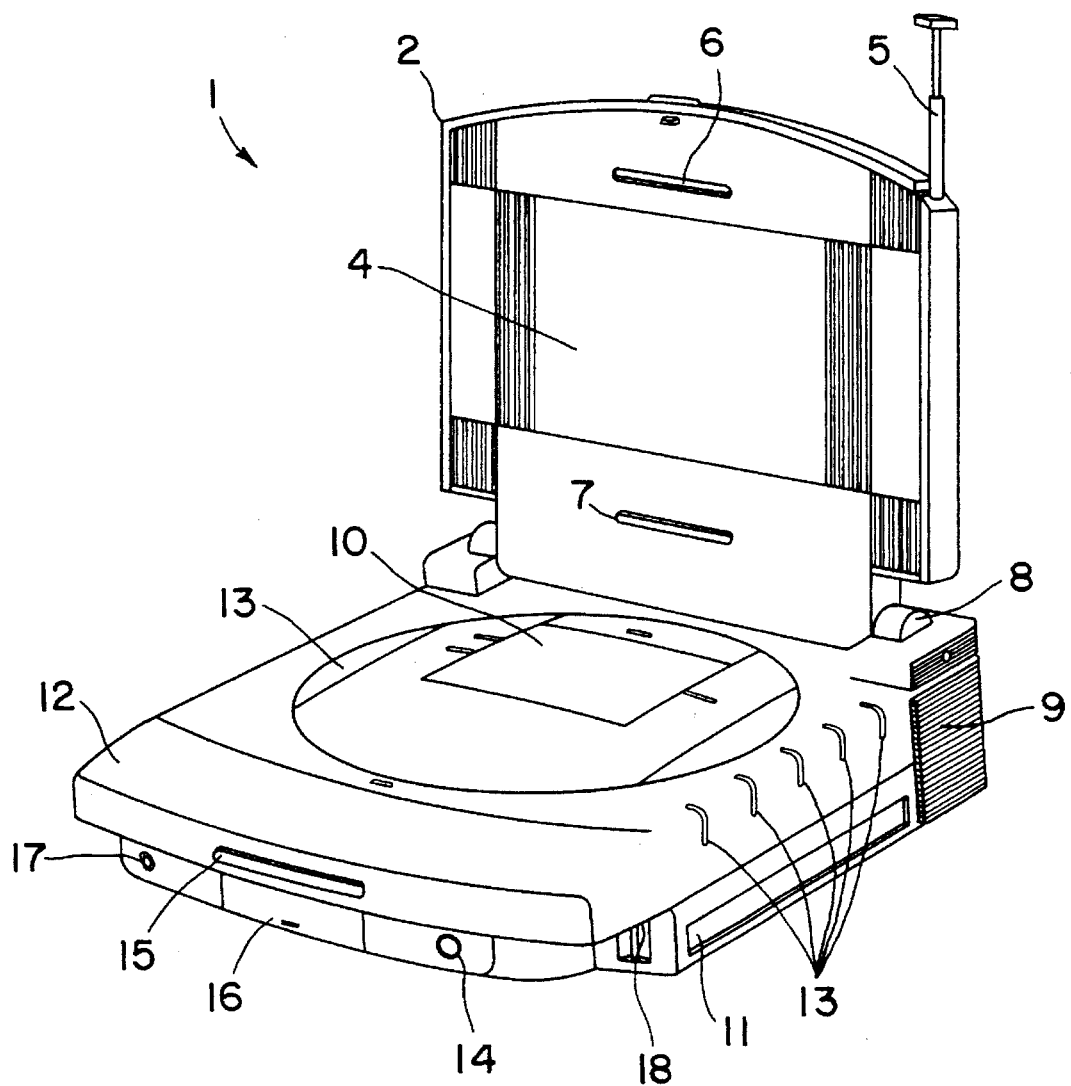
FIG. 1 is a perspective view of the preferred embodiment.

Referring now to FIG. 1, a multi-media device 1 is shown which comprises a main body 9 and a cover 2 which can include an LCD monitor 4, a TV antenna 5, a brightness control 6 for the monitor 4 and a TV tuner 7. Such a configuration utilising the cover, permits the device 1 to receive broadcast TV signals and display television and multi-media images on the LCD monitor 4. The cover 2 connects to the main body 9 via hinge type connectors 8.

Arranged on the main body 9 is a touch panel 10 which is ergonomically designed to permit a user ready access to a number of selectors arranged thereon.

The main body 9 is configured to receive a CDROM caddy 11 which permits the reading of video, audio and text data from a CDROM enclosed therein. A palm rest 12 is provided upon which a user can rest his hand whilst using the touch panel 10. A number of selector buttons 13 are arranged on the side of the body 9 which permits further selection of various functions of the device 1. A substantially conventional optional infra-red remote control device (not illustrated) can be provided and configured in a manner identical to the touch panel 10 and the selector buttons 13. The signals from the remote control device are received by an IR receiver 16 arranged in the main body 9, thus permitting in use the interconnection of the device 1 like, for example, a television set, whereby remote control of the device 1 can be enabled at a distance.

The device 1 includes audio signal processing abilities which include a microphone socket 14, a volume control 15 and a headphone socket 17. A connector 18 is provided for a shoulder strap, thus permitting the device 1 to be carried and used in a portable configuration. A rechargeable battery (not shown) is provided which permits portable operation of the device 1.

The device 1 also can include a memory card socket (not shown) for the receipt of a memory card 21 which can include ROM and/or RAM, thereby permitting data transfer between the device 1 and other computer devices or video generating devices.

Figure 2:
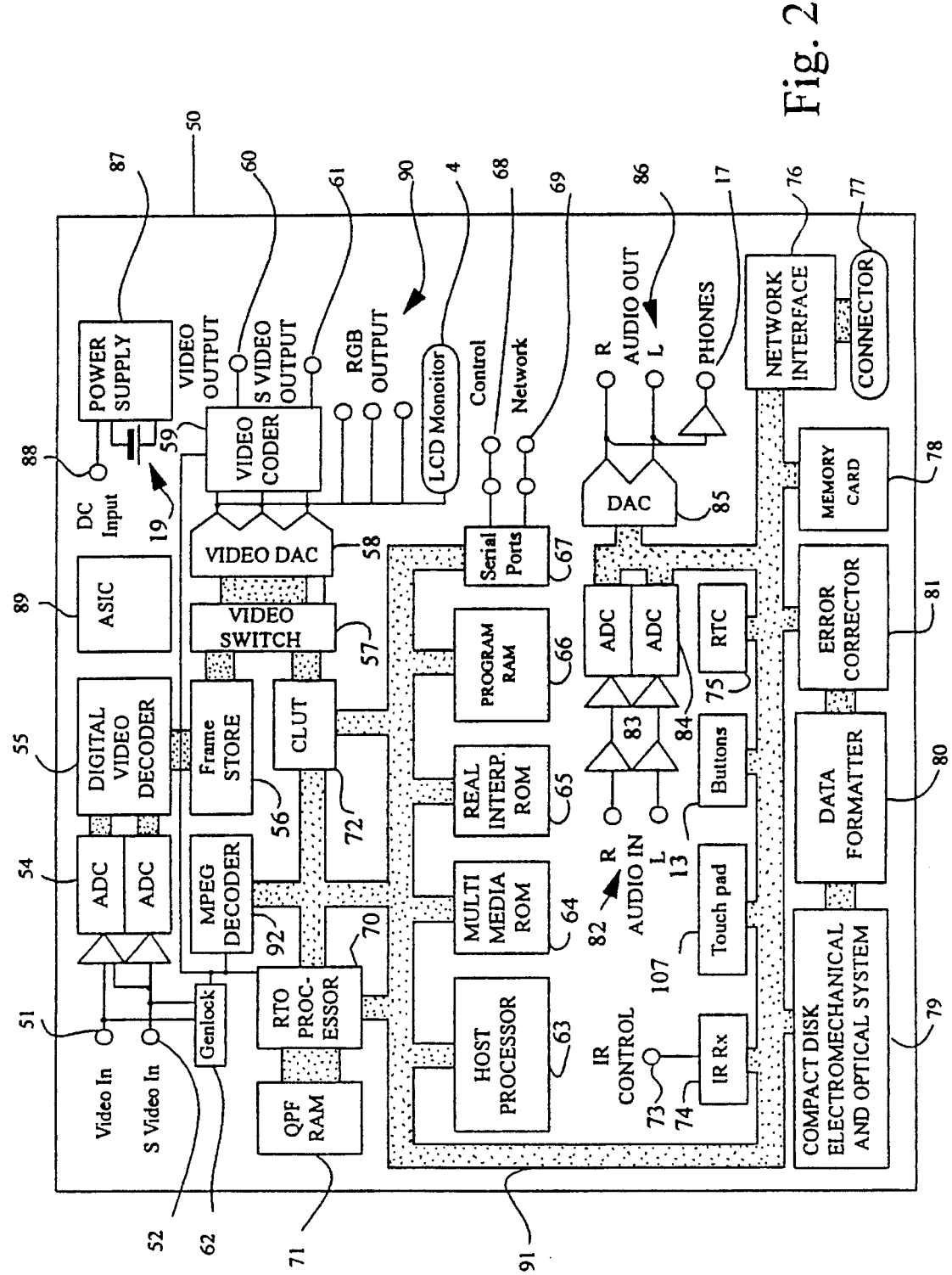
FIG. 2 is a schematic block diagram representation of the electronic circuitry of the device of FIG. 1.

Turning now to FIG. 2, the internal circuitry 50 of the device 1 is shown. The circuitry can be divided into three sections, the first of which comprises a video processing section, the second relating to audio processing and the third relating to system control and data interface.

Seen at the top of FIG. 2 is a video input 51 and an S video input 52, each of which permits connection to a corresponding video source such as a camera or VCR. The inputs 51 and 52 input to respective analogue to digital converters 54. Digital video signals are decoded in a digital decoder 55, such as a Philips SAA 7151 which then permits storage of the video signal in a frame store 56. The frame store 56 supplies video information to a video switch 57 which can thereafter output it to a video DAC 58 for output from the device either as an RGB output 90, directly to the LCD monitor 4, or via a video coder 59, to a corresponding video output 60 and an S video output 61. The operation of the video coder 59 is synchronised to incoming video signals via a genlock unit 62. The video componentry described above permits the input of video signals and the output thereof either to an appropriately configured monitor or via corresponding outputs.

Also provided in the video section of the circuitry 50 are components which permit alterable animation of video signals. A real-time object processor 70, such as that disclosed in U.S. patent application Ser. No 08/053,373, filed Apr. 28, 1993, claiming priority from Australian Patent Application No PL 2147, filed Apr. 19, 1992, entitled "A Real-Time Object Based Graphics System" lodged concurrently herewith and the disclosure of which is hereby incorporated by reference, permits the generation of animated images in real-time for display on a standard video display or by means of a colour laser printer. The RTO processor 70 uses a dedicated QPF (quadratic polynomial fragment) RAM 71 for the processing of object graphics which are output to a colour lookup table (CLUT) 72 which also connects to the video switch 57. In this manner, graphic objects and their corresponding animations can be combined using the switch 57 with video signals input via either one of the inputs 51 or 52. Consequently, the circuitry 50 operates to combine live video signals with alterable animation, thus producing a combined image.

The circuitry 50 also includes an audio processing network which includes stereo audio inputs 82 which drive corresponding buffer amplifiers 83 to input to analogue-to-digital converters 84. Audio signals are output via a digital-to-analogue converter 85 to a standard stereo output 86 or via an amplifier to the head phone outlet 17. Also provided is a CDROM-type compact disc electro-mechanical and optical system 79 which permits the reading of data stored on a compact disc, thus permitting the circuitry 50 to operate as a compact disc player in which data is read from the optical system 79, is configured within a data formatter 80 and corrected for errors in an error correction unit 81 prior to being output to the DAC 85 for reproduction.

The compact disk mechanism 11,79 is also used to play back CDROMS which may contain multi-media information, text programs, still images, MPEG compressed video, or object based real-time animation (RTO).

The circuitry 50 is under the operation of a host processor 63 which is preferably compatible with existing CDROM based multi-media software. A multi-media ROM 64 is provided which contains software which permits compatibility between the device 1 and other multi-media systems.

An interpreter ROM 65 is provided which permits language interpretation of a real-time animation software language which is used for the specific control of the RTO processor 70 in forming alterable animation. A program RAM 66 provides approximately 512 KBytes and is used as a scratch-pad RAM for the host processor 63. In particular, the RAM 66 is used for the creation of display lists read by the RTO processor 70 for the creation of alterable animation and for cacheing animation objects. Also connected to the bus 91 is a series of serial ports 67 which permit connection to control networks 68,69, thus permitting interconnection of the device 1 with desktop computers and the like. The memory card socket 78 connects directly to the bus 91 and enables the direct reading of data stored on memory cards by the processor 63 for use in either video, audio and/or data purposes.

A network interface 76 also connects to the bus 91 and to which a connector 77 permits interconnection of the device 1 with a data network or with a colour printer such as that contained within the Canon CLC500 colour laser copier. A real-time clock 75 is also provided which permits synchronisation of video and audio and data events in real-time.

An ASIC 89 is also provided which incorporates all logical elements such as OR and NAND gates, state machines and the like which are used in the interconnection of the other components. The provision of these elements as an ASIC reduces their size and cost and accordingly does not significantly increase the size of the device 1, which would otherwise be the case if discrete IC devices were used.

The device 1 has numerous applications which are afforded by the variety of electronic componentry which is seen in FIG. 2. Firstly, the multi-media ROM 64 permits compatibility with other multi-media systems, thus permitting wide consumer acceptance. Also, provision of the RTO processor 70 permits the generation of interactive animation for entertainment, games and education.

Furthermore, digitally compressed movies can be supplied via the CDROM and viewed either on the LCD monitor 4 or via a VDU connected to either of the outputs 60, 61 or 90. Also, the device 1 can operate as a standard audio CD player or as a portable CD player.

The alterable animation capabilities of the device 1 permits video editing, animation and tilting of both live and object based graphic images. Images generated by the device 1 can be printed via the interface 76 using a colour laser copier which permits low cost desktop publishing. An MPEG decoder 92 permits the reading of compressed video data from a compact disc or the memory card 78 and the storing of such data in the frame store 56 prior to display. Furthermore, the device 1 can be interconnected with a standard keyboard via the serial ports 67, thus permitting operation as a personal computer.

For video production, the device 1 is capable of creating quality animation at low cost and can operate as a video paint system. As indicated earlier, it can control a suitable VCR and be used as an editing system and can generate high-quality, fully animated titles in real-time. Large libraries of video stills are currently available and can be incorporated using the CDROM. Sound editing is available using two-track digital sound techniques from either analogue or digital sources. Libraries of sound effects are also available on CDROM and can also be used.

The image resolution of the device 1 is sufficient to provide full PAL and NTSC line resolution with a pixel rate of 13.5 MPixels per second, giving 720 pixels per line. This is the rate adopted by the CCIR601 committee for digital broadcast television production. The animation complexity available is up to 8,000 curves per image in real-time which is sufficient to animate approximately 300 text characters or approximately 20 objects of the complexity of the Disney related character Donald Duck. Because all animated objects are generated using quadratic polynomial fragments, scaling of object sizes can be formed without significant loss of quality.

The foregoing describes only one embodiment of the present invention, and modifications obvious to those skilled in the art, can be made thereto without departing from the scope of the present invention.

We claim:

1. A multi-media device comprising:

video means having at least one video input for receiving at least one input video signal and for selectively augmenting said input video signal for output as an output video signal via a video output;

audio means including means for receiving at least one input audio signal and for outputting at least one output audio signal;

host processor means interconnecting said audio means and said video means via interfaces enabling connection of said multi-media device for data input and output; and real-time object processor means connected to said host processor means for generating alterable animation image data from object based graphic data supplied from said host processor means in real-time for display via said video output in combination with said input video signal without using a frame buffer.

2. A multi-media device as claimed in claim 1 further comprising data input means connected to said real-time object processor means and said host processor means and adapted to input said object based graphics data for use by said real-time object processor means, said real-time object processor generating said alterable animation image data without the use of a pixel based storage means.

3. A multi-media device as claimed in claim 2 wherein said object based graphics data comprises quadratic polynomial fragments.

4. A multi-media device as claimed in claim 2 wherein said data input means further comprises a decompression means adapted to decompress input data.

5. A multi-media device as claimed in claim 2 wherein said data input means includes a plurality of memory storage receiving means adapted to receive detachable memory storage devices containing object image data.

6. A multi-media device as claimed in claim 5 wherein said detachable memory storage devices are in the form of non-volatile memory cards.

7. A multi-media device as claimed in claim 5 wherein said memory storage devices include system code used in the operation of said host processor means.

8. A multi-media device as claimed in claim 1 further comprising a CDROM input means.

9. A multi-media device as claimed in claim 1 further comprising a user input means including an infra-red remote control input means.

10. A multi-media device as claimed in claim 1 wherein said video means includes a frame storage means for storing said at least one video signal and means for combining an output of said frame storage means with said alterable animation image data and outputting the combination via said video output.

11. A multi-media device as claimed in claim 10 wherein said real-time object processor means outputs to a colour lookup table device which in turn outputs to said means for combining.

12. A multi-media device as claimed in claim 1 further comprising gen-locking means connected to said video means and said real-time object processor means for synchronizing said multi-media device to said input video signal.

13. A multi-media device as claimed in claim 1 wherein said audio means further comprises a control means with associated memory means for generating audio output signals in concert with said video output signal.

14. A multi-media device as claimed in claim 1 wherein said audio output signals are generated in substantial synchronism with visual events depicted by said video output signals.

* * * * *

UNITED STATES PATENT AND TRADEMARK OFFICE
CERTIFICATE OF CORRECTION

PATENT NO. : 5,566,290

DATED : October 15, 1996

INVENTOR(S) : KIA SILVERBROOK

It is certified that error appears in the above-identified patent and that said Letters Patent is hereby corrected as shown below:

Column 2, line 59, please change "19," to --29,--.

Signed and Sealed this

Sixth Day of May, 1997

Attest:

BRUCE LEHMAN

*Attesting Officer*      *Commissioner of Patents and Trademarks*